June 3, 1952
C. E. PETERS ET AL
2,599,478
APPARATUS FOR MAKING DEVICES WHICH HAVE
SELENIUM AS CONSTITUENT PARTS THEREOF
Filed March 15, 1948
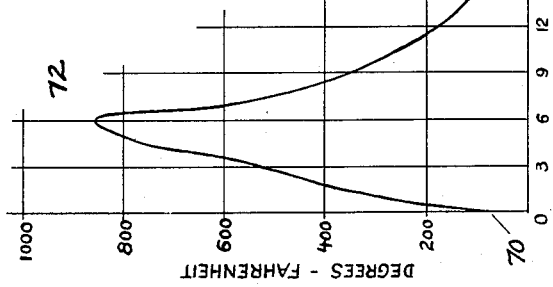
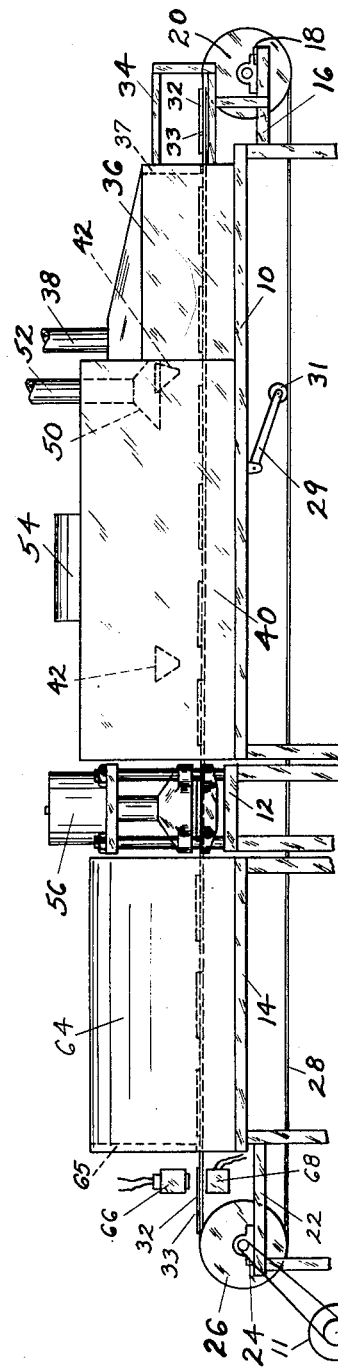
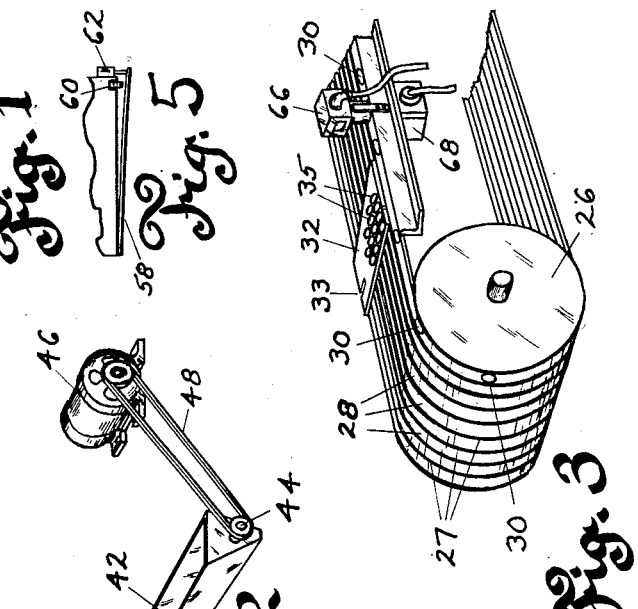
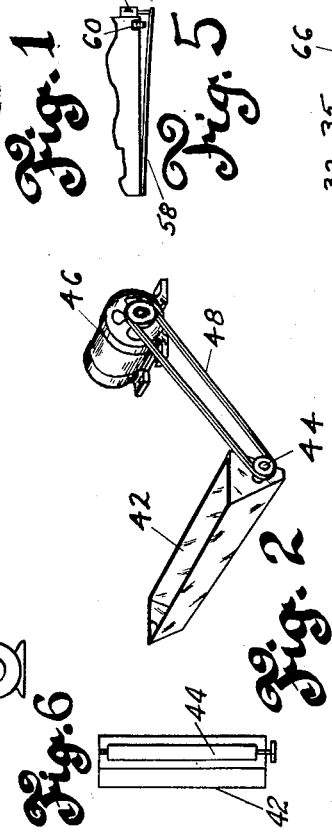
INVENTORS
Carl E. Peters,
David W. Rau and
August H. Bruemmer
BY
Ray Eilers
ATTORNEY Patented June 3, 1952

2,599,478

UNITED STATES PATENT OFFICE 2,599,478

APPARATUS FOR MAKING DEVICES WHICH HAVE SELENIUM AS CONSTITUENT PARTS THEREOF

Carl E. Peters, University City, David W. Rau, Kirkwood, and August H. Bruemmer, St. Louis, Mo., assignors to Vickers, Incorporated, a corporation of Michigan Application March 15, 1948, Serial No. 14,906

13 Claims. (Cl. 118—59)

This invention relates to improvement in devices which have selenium as constituent parts thereof. More particularly, this invention relates to an improved method and apparatus for making articles which have selenium as constituent parts thereof.

It is therefore an object of the present invention to provide an improved apparatus for making articles which have selenium as constituent parts thereof.

In the manufacture of articles which have selenium as constituent parts thereof, it is customary to punch out or otherwise form a base plate, to attach and affix a coating of selenium to that base plate, as by heating the base plate and rubbing selenium against it or by evaporating selenium and causing it to condense on the surface of the base plate or by heating the base plate and depositing powdered selenium on it or by other suitable method, to press the coated base plate in the presence of heat and thereby attain a uniform surface for the base plate, to heat the coated base plate in an annealing oven, and to treat the selenium surface, as by coating it with a layer of low-melting point spray metal which can serve as a counterelectrode. Heretofore, it has been customary to perform each of these various operations at spaced points in the manufactories where the articles, which have selenium as constituent parts thereof, are made. It has been customary to locate the equipment and employees required for the coating operation at one point in the manufactory, to locate the equipment and employees required for the pressing operation at another point in the manufactory, and so on throughout the rest of the process. This practice is useful in that it groups all similar machines and employees together; but it is uneconomic in that it requires loading of the base plates onto trays or racks at the conclusion of each operation, it requires storage of these trays or racks until the employees and equipment performing the next operation are ready for additional base plates, it requires moving of the trays or racks adjacent those employees and that equipment, and it requires unloading of the base plates from the trays or racks. This results in multiple handling of the base plates, it results in extra cost because of the need of extra employees to load and move and then unload the trays or racks, it increases the inventory being processed, it can lead to uneconomic waiting time for some employees and equipment, it leads to loss of heat where the process requires heating of the selenium at different times, and it permits dust, dirt, and moisture to contact the selenium surfaces of the base plates. In addition, these prior methods provided non-uniform articles which had selenium as constituent parts thereof because the employees cannot work with the precision of machines. For these various reasons, prior methods and apparatus for making articles which have selenium as constituent parts thereof are objectionable. The present invention obviates these objections by providing a method and apparatus for the continuous processing of articles which have selenium as constituent parts thereof. From the time the base plate is initially heated until after the time it is annealed, the base plate is confined within one apparatus that performs all of the required operations. The bare base plate is inserted in one end of the apparatus and it comes out at the other end with an applied, pressed, and annealed coating of selenium; and all of this without being touched by a human hand. With such an apparatus, selenium-coated base plates of uniformly high quality and uniformly low cost can be made. It is therefore an object of the present invention to provide an apparatus for the continuous processing of articles which have selenium as constitutent parts thereof.

The continuous processing provided by the present invention not only reduces the labor cost in making articles which have selenium as constituent parts thereof, but it also reduces the number of rejects and it reduces the inventory being processed. In addition, it reduces the working area required in the processing of such articles.

The apparatus provided by the present invention utilizes metal sheets, referred to as under-platens, to support the base plates and carry them from station to station in the apparatus. These under-platens can be made wider and longer than any of the base plates to be processed; and thus the under-platens can accommodate base plates from the smallest to the largest sizes. It is therefore an object of provide under-platens that can carry and support the base plates being processed.

The under-platens of the present invention carry the base plates from the entrance to the exit of the apparatus; and they are supported and guided at all times by an advancing mechanism. That mechanism can take the form of a number of heat-resistant belts which support and guide the under-platens, or it can take the form of guide coils that support the under-platens and movable dogs that advance the under-platens.

Where belts are used, it is desirable to use a number of narrow belts, positioned side by side; since any slack in the belts can be taken up by a simple idler pulley arrangement. Where the guide rails and movable dogs are used, the under-platens are preferably connected together and pulled through the apparatus by movable dogs adjacent the outlet of that apparatus.

In the operation of the apparatus provided by the present invention, it is desirable to have the under-platens move step-wise rather than continuously; because such movement minimizes the overall length of the apparatus. Accordingly, the advancing mechanism is arranged so the under-platens can be alternately moved or held stationary. It is desirable to initiate movement of the under-platens in accordance with a time schedule and to stop them when they reach the desired position. This is done by making the various stations in the apparatus of uniform length, and by making the periods of rest in each station uniform in length. Where this is done, it is possible to have exact control of the under-platens by starting the advancing mechanism in accordance with a time cycle and by stopping that mechanism when a certain part of that mechanism or a part of the under-platen reaches a predetermined position. It is therefore an object of the present invention to provide an apparatus which initiates movement of under-platens in accordance with a time cycle and stops such movement according to position.

As the advancing mechanism, provided by the present invention, moves the under-platens and the base plates thereon to and through the various stations of that apparatus, the mechanisms at those stations act upon the base plates. Two of the mechanisms sprinkle selenium powder on the plates while a third mechanism presses the selenium-coated base plates. The operation of these various mechanisms must be so coordinated and synchronized with the actuation of the advancing mechanism that the under-platens and the base plates thereon receive the desired treatment at the proper time. It is therefore an object of the present invention to provide a multi-station apparatus wherein the operation of the mechanisms at the various stations is coordinated and correlated with the actuation of the advancing mechanism for that apparatus.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purposes of illustration only and do not limit the invention and that the invention will be defined by the appended claims.

In the drawing Fig. 1 is a generally schematic, side elevational view of an apparatus that is made in accordance with the principles and teachings of the present invention, Fig. 2 is a perspective view of a powder-spreading trough and the motor for driving same, Fig. 3 is a perspective view of the discharge end of the apparatus shown in Fig. 1, Fig. 4 is a chart showing the temperatures experienced by base plates treated in the apparatus shown in Fig. 1, and Fig. 5 is an end elevational view of the upper pressure member of the press used in the apparatus shown in Fig. 1.

Fig. 6 is a plan view of the powder-spreading trough and the rotor.

Referring to the drawing in detail, the numeral 10 denotes an elongated supporting platform. This platform is quite sturdy and it is of stout material. A smaller platform 12, of comparable sturdiness, is positioned adjacent the left hand end of the supporting platform 10; and a third supporting platform, that is of comparable sturdiness, is denoted by the numeral 14, and is positioned adjacent the left hand end of supporting platform 12. The three platforms 10, 12 and 14 are aligned in a row to form a continuous support for the apparatus of the present invention; which apparatus can provide continuous processing of devices which have selenium as constituent parts thereof.

A horizontally disposed projection 16 is secured to the right hand end of the platform 10; and that projection, together with a projection of identical form which is disposed behind the projection 16 and is also secured to platform 10, constitutes a yoke which supports spaced bearings 18. The bearings 18 rotatably support a wide-faced pulley 20 which is positioned between the two projections 16. Two projections 22, one of which is shown, are secured to the left hand end of the supporting platform 14; and those projections are spaced apart to form a yoke which carries the bearings 24. The bearings 24 rotatably support a wide-faced pulley 26 that is disposed between the projections 22 and that is operatively connected to a motor 11 by any customary suitable means.

The pulleys 20 and 26 are of similar diameter and width; and they support a plurality of narrow belts 28. The belts 28 are parallel to each other, and the confronting edges of adjacent belts are spaced close to each other. The faces of the pulleys 20 and 26 are preferably provided with circumferentially-extending raised portions or ribs 27 which guide the belts 28 and hold them in alignment with each other. One of the belts 28 has a plurality of spaced openings 30 therein, and that belt is disposed to the right of the rest of the belts 28.

The numeral 31 denotes idler pulleys which are positioned below the supporting platform 10 and which press downwardly on the belts 28. There will be one idler pulley 31 for each belt 28, and each of the idler pulleys 31 has its own supporting arm 29 pivoted to the platform 10. With this arrangement, the weight of the pulleys 31, either alone or reinforced by a spring if so desired, will press downwardly upon the "returning" portions of the belts 38, thus keeping all portions of the belts 28 taut.

Each of the belts 28 is positioned partly above and partly below the upper surface of the supporting platforms 10, 12 and 14. The portions of the belts which are below the platforms 10, 12 and 14 are the "returning" portions of the belts while the portions of the belts 28 above those platforms are the "advancing" portions of those belts. The "advancing" portions of the belts 28 serve as an advancing mechanism for under-platens 32. Another form of advancing mechanism for the under-platens may consist of L-shaped guide rails that guide and support the under-platens 32; and movable dogs adjacent the exit end of the apparatus. These dogs will rise upwardly until they engage the trailing edge of the exiting under-platen 32, will move horizontally until they advance that under-platen to the unloading position; and will then move downwardly out of engagement with that under-platen preparatory to returning to the initial position. The various under-platens 32 can be secured together by hooks or other couplings so advancement of the exiting under-platen will pull the rest of the under-platens to the next station. The operator can couple the under-platens together at the loading station and uncouple them at the unloading station; and in between those stations the couplings will join the under-platens for simultaneous movement while maintaining the required spacing between the under-platens. Whether the advancing mechanism has the form of endless belts or movable dogs, that mechanism will provide successive advancements and rests for the under-platens.

The under-platens 32 are preferably as wide as the wide-faced pulleys 20 and 26, and they are disposed transversely of the belts 28. The under-platens 32 must be capable of absorbing considerable quantities of heat without becoming warped or distorted; and they are preferably made of the high silicon steel customarily used in the cores of electric transformers. It has been found that twenty-nine (29) gauge silicon steel is quite satisfactory. The under-platens 32 are preferably provided with slots 33 that extend inwardly from the side edges of the under-platens. These slots are spaced rearwardly of the leading edges of the under-platens 32, and the length of each of the slots 33 is approximately one-tenth ($\frac{1}{10}$) of the width of the under-platens 32. The under-platens 30 support and carry the base plates 35 which are to be coated with selenium; and each of the under-platens 32 is larger than the largest of the base plates 35 to be coated. As a result, the under-platens 32 can accommodate the largest and smallest base plates required by the manufacturer. The under-platens 32 are preferably coated with a thin layer of chromium; such coating preventing adherence of selenium to the under-platens 35. If desired, an intermediate coating of nickel can be provided on the under-platens 32.

When the base plates 35 have a circular configuration, as shown in Fig. 3, the base plates can be placed so the peripheries of adjacent base plates are in contact. However, where the base plates are of polygonal configuration, it is desirable to space the base plates apart a short distance; because that spacing permits excess selenium, in the coating applied to those base plates, to pass into the spaces between the base plates when those plates are pressed in the press. Similar spacing is automatically provided where the base plates are of circular configuration, since the base plates cannot be fitted together without gaps being formed between them.

The upper portions of the belts 28 are enclosed and surrounded by a succession of chambers and mechanisms; and each of the chambers or mechanisms provides one or more stations where the base plate 35 on the under-platens 32 can be treated. The first of these chambers is denoted by the numeral 34; and it is an open-sided, covered housing that serves as the loading station for the apparatus. The cover of this housing 34 protects the base plates 35 on under-platens 32 against dust and other foreign materials in the air adjacent the apparatus. Thus the surfaces of the base plates are kept free from contamination that might interfere with the secure attachment of the selenium coatings to the base plates 35. The open side of the housing 34 permits ready insertion of under-platens 32; and permits the operator of the apparatus to set the under-platens 32 directly on the belts 28. Suitable markings, not shown, are provided inside the housing 34 to guide the operator in placing the under-platens 32 on the belts 28. The belts 28 will, of course, be at rest whenever an under-platen is set in position on them; and that under-platen will move with the belts when they are advanced to the next position.

Immediately adjacent the loading station 34 is a pre-heating muffle 36. This muffle may be heated by gas, electricity, oil or any suitable means; but it is preferably heated in such a way that close regulation of the temperatures therein is attained. An exhaust duct 38 is provided for the pre-heating muffle 36, and that duct will carry away any fumes or vapors caused by the heating of the under-platens 32 and the base plates 35 carried thereby. It may sometimes happen that small quantities of selenium will adhere to the under-platens 32; and that selenium will vaporize when the under-platens pass through pre-heating muffle 36. Such vapor will be conducted away from the vicinity of the apparatus; thus protecting the operator against inhalation of selenium vapors.

The pre-heating muffle 36 is more than twice the length of the loading station 34; and it provides two stations for the under-platens 32 and the base plates carried thereby. The base plates 35 will absorb heat in each of these stations, and they will leave the pre-heating muffle 36 with temperatures several hundred degrees Fahrenheit above their initial temperatures.

The outlet of the pre-heating muffle 36 is immediately adjacent a coating chamber 40; and that chamber receives the under-platens 32 and the base plates 35 thereon as they emerge from the pre-heating muffle 36. The coating chamber is over four times as long as the loading station 34; and it provides four distinct stations for the under-platens 32. The first of those stations is at the right hand end of chamber 40, and it is adjacent the first of two powder-distributing troughs 42 in chamber 40. The first of the two troughs 42 is positioned immediately adjacent inlet opening of chamber 40, while the second of the two troughs is adjacent the outlet end of chamber 40. Each of the troughs 42 is generally V-shaped in cross section, and each of those troughs is long enough to overlie the belts 28 and the under-platens 32 carried by those belts.

The troughs 42 are disposed transversely of the belts 28; and the discharge opening in the bottom of each trough is parallel to the leading and trailing edges of the under-platens 32. A rotor 44 is rotatably mounted adjacent the discharge opening, not shown, at the bottom of the trough 42; and rotation of the rotor 44 will cause powder to sprinkle down onto the base plates 35 carried by the under-platens 32. A motor 46 is provided adjacent each trough 42, and that motor is operatively connected to the rotor 44 by means of the belt 48 and the sheaves on the rotor 44 and the motor shaft. When the motors 46 are not energized, the rotors 44 will keep the powder in troughs 42 from sprinkling onto the base plates carried by the under-platens 32. Thus, selective discharge of selenium powder is attained.

A fume hood 50 is positioned immediately adjacent the first trough 42. This fume hood, and the exhaust duct 52 connected thereto, will quickly remove and carry away any selenium fumes or vapors that form when selenium powder from the first trough 42 strikes the base plates 35 on under-platens 32. The temperature of the base plates 35 is preferably high enough so the selenium powder will melt quickly and will react with the surface of the base plates to form a selenide coating. In this heating step, it is inevitable that considerable selenium vapors and fumes will form. By immediately withdrawing the selenium fumes and vapors, the hood 50 protects the operators of the apparatus from inhalation of those fumes and vapors; and it also keeps those fumes and vapors from condensing in the coating chamber 40. This latter result is particularly desirable since the chamber 40 is kept cool by cold air that passes into and out of the chamber 40 through the duct 54; and the low temperature of that chamber fosters condensation.

The duct 54 is connected to a refrigerating or cooling device, not shown, of usual and customary form; and that device provides a sufficient amount of cool air to maintain the mean temperature in the coating chamber 40 at a predetermined low temperature. Certain areas of chamber 40 will be warmer than the rest, because some of the heat of the base plates 35 and much of the heat of the under-platens 32 will be dissipated in the chamber 40. However, the melting of the selenium powder and the concomitant forming of the selenide coating on the surface of the base plates are endothermic reactions; and in addition, the under-platens 32 and base plates 35 remain in contact with the cool air introduced into the cooling chamber 40 for such a relatively long time that most of the heat is dissipated from the under-platens and base plates before they pass from chamber 40.

Prior to the time the under-platens 32 and the base plates 35 pass from the cooling chamber 40, they pass beneath the second powder-distributing trough 42. By the time the under-platens 32 and the base plates 35 reach the second trough 42, they are quite cool. Thus the selenium powder from the second trough 42 will be caught and held by the base plates without any evolution of selenium vapors or fumes.

In each instance, the rotor 44 of the powder-distributing trough 42 is caused to rotate as the leading edge of an under-platen approaches a line directly below the discharge opening of the trough; and that rotor is caused to stop as the trailing edge of that under-platen passes that line. This selective rotation and bolting of the rotors 44 is preferably controlled by the time-controlled mechanism that initiates movement of the belts 28. Such an arrangement provides perfect and exact synchronization of the operation of rotors 44 and belts 28; and it assures sprinkling of selenium powder on the base plates 35 while avoiding waste of the powder. Moreover, the rate of rotation of the rotors 44 is so determined, relative to the rate of advancement of the belts 28, that a powder coating of the desired thickness is provided on the base plates 35.

The selenium powders distributed on the base plates 35 by the troughs 42 may be of the same or different composition and size; but it is preferred to provide the powder in the second trough 42 with the exact amount and character of inoculant, and to make the particle size as desired. This is desirable because that powder provides the selenium surface for the base plates. The first powder can be of lesser refinement since it melts completely and will experience considerable loss of inoculant.

When the under-platens 32 and their powder-covered base plates 35 pass from coating hood 40, they enter a press 56, which may be operated by pneumatic or hydraulic pressure. The lower pressure member of the press 56 is stationary and is positioned immediately below the "advancing" portions of belts 28; and the upper pressure member of the press is movable toward and away from the upper surfaces of the belts 28. The upper member of the press 56 has a pressing face 58 that directly contacts the powdered selenium sprinkled onto those plates by the second trough 42. Both the upper and lower members of press 56 are heated; and when those members respectively contact the powder on the base plates and the under-platens that support the base plates, they heat the base plates and powder until the powder adheres to the selenide coating on the base plates. The press 56 continues to heat and press the base plates 35 until at least part of the selenium coating has been converted to grey crystalline selenium. Although various temperatures and pressures could be used in the pressing operation, a temperature of one hundred and thirty (130) degrees centigrade and a pressure of two hundred (200) pounds per square inch are quite satisfactory.

It is necessary to avoid adherence of the selenium-coated base plates to the pressing face 58 of the upper pressure member of the press 56. Such adherence is minimized by providing the pressing face 58 with a chromium content of at least fifteen percent (15%). In addition, the pressing face 58 is secured to the upper pressure member of the press 56 in such a way that it is normally angularly disposed relative to that pressure member. Moreover, only one side of the pressing face 58 is attached to the upper pressure member; thus the pressing face 58 acts as a cantilever. With this arrangement, the pressing face will bend into parallelism with the bottom of the upper pressure member of press 56 whenever the press is acting upon base plates, and it will assume the attitude shown in Fig. 5 when the upper pressure member moves away from the base plates. In moving from a position parallel to the upper pressure member to the position shown in Fig. 5, the pressing face 58 will flex. This flexing will effectively separate the selenium-coated base plates from the pressing face 58.

A spring 60, carried by the upper pressure member of the press 56 acts against the upper surface of pressing face 58 and that spring assists the natural resilience of the pressing face 58 in moving the face 58 to the position shown in Fig. 5. Thus prompt flexing of pressing face 58 is assured. A vibrator 62 is secured to the upper pressure member of the press 56, and it can be energized to impart a controlled vibration to the pressing face 58. This vibration will assist in freeing the selenium-coated base plates from the pressing face 58.

The press 56 must be timed, relative to the advancement of the belts 28, so the press is open when the belts 28 move and is closed when the belts 28 are at rest. In addition, the vibrator 62 should be energized as the upper member of the press 56 is moving away from the belts 28, and it should be deenergized at all other times. The timing of press 56 and vibrator 62 is preferably controlled by the timing mechanism which regulates and determines the periods of advancement and rest of the belts 28.

An oven 64 is disposed immediately adjacent the press 56, and that oven receives the under-platens 32 and the base plates 35 on those platens. This oven has a narrow muffle chamber which accommodates belts 28, under-platens 32 and base plates 35. This oven provides a closely controlled heat for the selenium-coated base plates 35, and it has three stations where the base plates receive heat.

An open space is provided adjacent the discharge end of oven 64. That space serves as an unloading station where the under-platens 32 and their base plates 35 can be lifted off of the belts 28. The base plates 35 are then removed from the under-platens 32, and those platens are brushed clean and re-used in the apparatus provided by the present invention.

A source of light 66 is positioned adjacent the unloading station of the apparatus, and that source is positioned above the belt 28 which has the openings 30. Immediately under that belt 28, and aligned directly with the source 66, is a housing 68 for a light responsive element. This element will normally not receive light from the source 66 because the belt is opaque; however that element will receive light from the source 66 when the openings 30 in belt 28 are in register with the light sources 66. This arrangement facilitates precise positioning of the belts 28 relative to the chambers and mechanisms through which they move. If desired, the openings could be filled with a heat-resistant disc of insulation, and the light source 66 and the light-responsive element in housing 68 could be replaced by an electrical brush; such brush completing a circuit through the belt 28 until the disc of insulation in opening 30 interrupted that circuit. In either of these ways, an electrical pulse can be created that will stop the advancing mechanism.

In brief, the operation of the apparatus shown in the drawing is as follows. The under-platens 32 are provided with base plates 35 and are placed on the belts 28 at the loading station 34. Thereafter the motor which drives belts 28 is set into motion in response to the time-controlled mechanism, and that motor will continue to run until the next opening 30 comes into register with light source 66. Thereupon, the motor will be deenergized and will remain deenergized until again set into motion by the time-controlled mechanism. During the time the motor was energized, the under-platen 32 was moved from the loading station 34 into the muffle 36. In the ensuing period of rest for the belts 28, the base plates 35 will absorb considerable amounts of heat. When the motor is again energized, it will move the under-platen 32 to the second station in muffle 36. Again the base plates will absorb heat; and when the motor is again energized, the base plates 35 will be quite hot. This energization of the motor will carry the base plates 35 under the first trough 42, the rotor of which is rotated when the belts 28 are moved. The powder from the first trough 42 will strike the hot base plates 35 and be melted and caused to react with the metal surfaces of the base plates. On the next energization of the motor, the under-platen 32 will be moved to the next station in coating chamber 40. Another energization of the motor takes the under-platen to the third station in coating hood 40. Another advancement of the belts 28 carries the under-platen under the second trough 42, which trough sprinkles powder when the belts 28 are moving. Yet another energization of the motor causes belts 28 to move the under-platen 32 out of coating hood 40 into press 56. Additional advancements of belts 28 move the under-platen into oven 64 and carry it through the three stations in that oven. The final advancement is to the unloading station. Instead of having just one under-platen 32 in the apparatus at any one time, a number of under-platens will be in the apparatus. In fact, each station of the apparatus will have an underplaten 32 at any instant.

In the apparatus provided by the present invention, each chamber or mechanism must have a length equivalent to one or more advancements of the belts 28. Thus the loading chamber 34 has a length equal to one station, the muffle 36 has a length equal to two stations, the coating chamber 40 has a length equal to four stations, the press 56 has a length equal to one station, the oven 64 has a length equal to three stations, and the unloading station is one station in length. Such dimensioning assures proper operation of the apparatus.

The muffle 36 and the oven 64 are provided with doors, 37 and 65 respectively, which are opened and closed as the under-platens 32 are moved into and out of the muffle and oven. Such doors are desirable to prevent loss of heat, to prevent stray currents of air from entering the muffle or oven, and to minimize radiation of heat outwardly from those two structures. The doors are preferably operated electrically; and they can be set into motion by the time-controlled mechanism that initiates the advancement of belts 28, causes rotation of rotors 44, causes upward and downward movement of the upper pressure member of press 56 and causes energization of vibration 62. Even when closed, the doors clear the belts 28.

Many different types of timing mechanisms could be used, but one simple and workable arrangement employs a number of commonly mounted cam discs that actuate switches which energize relays, and also employs a photosensitive call to energize the same or other relays. The cam discs will all be driven at the same speed by a clock motor or other constant speed device and will actuate switches in predetermined sequence. One cam disc should actuate a switch that energizes a relay which simultaneously opens the doors on the muffle 36 and oven 64, moves the upper pressure member of press 56 upwardly, and energizes the belt-advancing motor. The relay should have a number of contactors that would be moveable to make and break the circuits of the door-operating mechanism, the press-operating mechanism, and the belt-driving motors; and it should have an energizing coil to move the contactors to "on" positions and it should have a de-energizing coil to move the contactors to "off" position, and it should be constructed so the armature thereof would remain in the "on" position or "off" position until one or the other of the two coils was energized. With such a relay, the first cam disc need only actuate its switch momentarily to shift the relay to "on" position. Shortly after the first cam actuates its switch, a second cam disc will actuate the switch that energizes the motors 46 that drive the rotors 44 of powder-distributing troughs 42. This cam disc should have a "dwell" length equal to the time required for the under-platens to pass beneath the troughs 42, and it would then permit the switch to return to "off" position and deenergize the motors 46 until the next belt advancement. The belt advancement cycle will be completed when the next opening 30 in the belt 28 comes into registry with light source 66. At such time, light will strike the photo-sensitive element in housing 68 and will enable that element to energize the de-energizing coil of the relay which controls the doors of muffle 36 and oven 64, the movable pressure member of press 56, and the belt-advancing motor. This energization of the de-energizing coil moves the contactors of the relay to the "off" position until the next time the first cam disc actuates its switch. Thus precisely timed initiation of each cycle is attained and precise positioning of the under-platens 32 is attained. In the preferred embodiment of the invention, the under-platens require only five (5) seconds to move from station to station, and they remain in each station for three (3) minutes.

The temperature cycle of the base plates 36, being treated in the apparatus of Fig. 1, is shown in Fig. 4. The base plates are initially at room temperature as indicated by the numeral 70; but they are quickly heated, in the muffle 36, to a temperature of about eight hundred and twenty (820) degrees. At the end of two time intervals, or (6) minutes after the base plates move into muffle 36, the temperature of those plates is indicated by the numeral 72. This temperature is high enough to cause the formation of a selenide on the surface of the base plates; and when the base plates pass under the first trough 42 and receive a coating of selenium powder, those base plates will react with that coating to form a selenide. This reaction absorbs some heat from the base plates; and the cool air in coating hood 40 will absorb most of the rest of the heat from the base plates. At the time the base plates receive the second coating of selenium powder, their temperature is at a value indicated by the numeral 73; and when the base plates leave the coating hood 40, their temperature is a value indicated by numeral 74. In the press 56, the base plates are heated until they reach the temperature value indicated by the numeral 76. In the oven 64, the temperature of the base plates is raised to a value at or above the melting point of selenium. The numeral 78 indicates a temperature value in the range of two hundred eighteen or two hundred nineteen and seven-tenths (218–219.7) degrees centigrade. Upon removal from oven 64, the base plates are permitted to cool to the temperature value indicated by the numeral 80.

The cooling action of the air in coating hood 40 is quite important, because it maintains the selenium coating in the vitreous state and it keeps the powder in troughs 42 from becoming heated. Keeping the selenium coating in the vitreous state is desirable because it permits the use of relatively low temperatures in the press 56. Keeping the powder in troughs 42 from becoming heated is desirable because it prevents premature conversion of that powder to the grey crystalline state and it prevents softening of the powder with consequent clogging of the discharge openings of troughs 42. The temperature of the selenium in the troughs 42 is preferably held between sixty-five (65) and seventy (70) degrees Fahrenheit.

This apparatus provides a continuous processing of articles which have selenium as constituent parts thereof, and it does not require any hand operations from the time the under-platens 32 are loaded onto the belts 28 until they are picked up at the unloading station. Greater uniformity, lesser cost, and faster operations are made possible by this apparatus.

Whereas a preferred method and apparatus have been shown and described in the drawing and accompanying description it should be obvious to those skilled in the art that various changes may be made in the form of the invention without affecting the scope thereof.

What we claim is:

1. A press adapted to receive base plates and to heat and compress the selenium thereon, said press comprising a fixed pressure member, a movable pressure member, a heating element to impart heat to said base plates, and a flexible pressing face, said pressing face being secured at one end to said movable pressure member and having its other end free, the free end of said pressing face being biased away from said movable pressure member but being bendable into parallelism with said movable pressure member.

2. A machine for continuously processing articles which have selenium as constituent parts thereof that comprises a plurality of belts positioned adjacent each other to constitute a support, a plurality of wide-faced pulleys to support said belts, a plurality of idler pulleys to act upon said belts to keep them taut, a motor to rotate one of said wide-faced pulleys, openings in one of said belts, a time controlled means to initiate advancement of said belts, said time controlled means including a time controlled mechanism and said motor that rotates said one of said wide-faced pulleys, a photo-sensitive element cooperating with said openings in said one belt to halt an advancement of said belts, said time-controlled means and said photo-sensitive device co-acting to provide advancements of uniform length and rests of uniform duration for said belts, an under-platen carried by said belts, said under-platen being of silicon steel and being plated with chromium, said under-platen having slots therein spaced rearwardly of the leading edge thereof, a first section that includes a loading area, a chamber, movable doors on said chamber and a source of heat for said chamber, said chamber surrounding said belts to heat base plates carried by said under-platen, said chamber having a length that is an integral multiple of said length of advancement of said belts, said source of heat for said chamber being adapted within a period of time which is an integral multiple of said period of duration of rests for said belts to heat said base plates, said belts extending through said first section, a second section adjacent and contiguous to said first section, said second section including a powder-distributing trough, an exhaust hood, a chamber, a source of cooling effect for said chamber, and a second powder distributing trough, said first trough being adjacent the outlet of said chamber of said first section and disposed above said belt, a rotor in said trough that is rotatable to cause selective distribution of selenium powder onto said base plates as they emerge from said chamber of said first section in heated condition, said first trough being dimensioned to supply powder for said base plates during said advancements of said belts, said exhaust hood of said second section being adjacent said first trough to carry off fumes that are evolved when selenium powder from said first trough strikes said heated base plates, said chamber of said second section being adjacent said first trough to rapidly reduce the temperature of said base plates after said selenium powder has contacted said base plates to form coatings thereon and to thereby maintain the selenium coatings thereon in the vitreous state, said chamber of said second section having a length that is an integral multiple of said length of advancement of said belts, said source of cooling effect in said second section providing cooling within said chamber of said second section and being adapted within a period of time which is an integral multiple of said period of duration of rests for said belts to cool said base plates, said second powder distributing trough being dimensioned to supply powder for said base plates during advancements of said belts, said belts extending through said second section, a third section adjacent and contiguous to said second section, said third section including a press that has a fixed platen and a movable platen, said press being adjacent said second trough of said second section, said fixed platen of said press underlying said belts and said movable platen of said press overlying said belts and being movable toward and away from said belts, said movable platen of said press being movable away from said fixed platen of said press to admit said under-platen and being movable toward said fixed platen to press the selenium powder on said base plates carried by said under-platen, means controlled by the time-controlled means for moving said movable platen of said press, said press having a length that is an integral multiple of said length of advancement of said belts, said movable platen of said press having a flexible pressing face thereon, a vibrator adapted to impart vibrations to said pressing face, said pressing face being secured to one end of said movable platen of said press and having its other end free, the free end of said pressing face being biased away from said movable platen of said press but being bendable into parallelism with said movable platen, said pressing face having a chromium content of at least fifteen percent, said belts extending through said third section, a fourth section adjacent and contiguous to said third section, said fourth section including an oven chamber, a source of heat for said oven chamber, movable doors on said oven chamber and an unloading area, said oven chamber being adjacent said press of said third section and adapted to heat said base plates to a temperature at or above the melting point of selenium, said oven chamber having a length that is an integral multiple of said length of advancement of said belts, said source of heat for said oven chamber being adapted within a period of time which is an integral multiple of said period of duration of rest for said belts to heat said base plates, said belts extending through said fourth section, said belts being adapted to support said under-platen in each of said four sections of said machine and to support said under-platen in its movement between each of said sections, said time controlled means advancing said under-platen successively through each of said four sections.

3. A machine for continuously processing articles which have selenium as constituent parts thereof that comprises advancing means for providing advancements of uniform length and for providing rests of uniform duration, a time-controlled means to initiate advancement of said belts, an under-platen having a slot thereon spaced rearwardly of the leading edge thereof, said advancing means including a support for said under-platen extending through said machine and a motion-imparting mechanism cooperating with said advancing means to advance said under-platen through said machine, a first section that includes a loading area, a chamber and a source of heat for said chamber, said chamber having a length that is an integral multiple of said length of advancement, said source of heat for said chamber being adapted within a period of time which is an integral multiple of said period of duration of rest to heat base plates carried by said under-platen, said support extending through said first section, a second section adjacent and contiguous to said first section, said second section including a powder-distributing trough, a chamber, a source of cooling effect for said chamber and a second powder-distributing trough, said first trough being adjacent the outlet of said chamber of said first section and being dimensioned to supply powder for said base plates during said advancements, a rotor in said first trough that is rotatable to cause selective distribution of selenium powder onto said base plates as they emerge from said chamber of said first section in heated condition, said chamber of said second section being adjacent said first trough to rapidly reduce the temperature of said base plates after said selenium powder has contacted said base plates to form coatings thereon and thereby maintain selenium coatings thereon in the vitreous state, said chamber of said second section having a length that is an integral multiple of said length of advancement, said source of cooling effect in said second section providing cooling within said chamber of said second section and being adapted within a time which is an integral multiple of said period of duration of rests to cool said base plates, said second powder distributing trough in said second section being dimensioned to supply powder for said base plates during said advancements, said support of said advancing means extending through said second section, a third section adjacent and contiguous to said second section, said third section including a press that has a fixed platen and a movable platen, said movable platen of said press being movable away from said fixed platen of said press to admit said under-platen and being movable toward said fixed platen to press the selenium powder on said base plates carried by said under-platen, means controlled by the time-controlled means for moving said movable platen of said press, said press having a length that is an integral multiple of said length of advancement, said support of said advancing means extending through said third section, a fourth section adjacent and contiguous to said third section, said fourth section including an oven chamber, a source of heat for said oven chamber, and an unloading area, said oven chamber having a length that is an integral multiple of said length of advancement, said source of heat for said oven chamber being adapted within a period of time which is an integral multiple of said period of duration of rest to heat said base plates, said support of said advancing means extending through said fourth section, said support being adapted to support said under-platen in each of said four sections of said machine and to support said under-platen in its movement between each of said sections, said motion-imparting mechanism advancing said under-platen successively through each of said four sections.

4. A machine for continuously processing articles which have selenium as constituent parts thereof that comprises an advancing means for providing advancements of uniform length and for providing rests of uniform duration, a time-controlled means to initiate advancement of said belts, an under-platen, said advancing means including a support for said under-platen extending through said machine and a motion-imparting mechanism cooperating with said advancing means to advance said under-platen through said machine, a first section that includes a loading area, a chamber and a source of heat for said chamber, said chamber having a length that is an integral multiple of said length of advancement, said source of heat for said chamber being adapted within a period of time which is an integral multiple of said period of duration of rest to heat base plates carried by said under-platen, said support extending through said first section, a second section adjacent and contiguous to said first section, said second section including a powder-distributing trough, a rotor in said trough that is rotatable to cause selective distribution of selenium powder onto said base plates as they emerge from said chamber of said first section in heated condition and a second powder-distributing trough, said first trough being adjacent the outlet of said chamber of said first section and being disposed above said support, said first trough being dimensioned to supply powder for said base plates during said advancements, said support of said advancing means extending through said second section, a third section adjacent and contiguous to said second section, said third section including a press that has a fixed platen and a movable platen, means controlled by the time-controlled means for moving said movable platen of said press, said press having a length that is an integral multiple of said length of advancement, said support of said advancing means extending through said third section, a fourth section adjacent and contiguous to said third section, said fourth section including an oven chamber, a source of heat for said oven chamber, and an unloading area, said oven chamber having a length that is an integral multiple of said length of advancement, said source of heat for said oven chamber being adapted within a period of time which is an integral multiple of said period of duration of rest to heat said base plates, said support of said advancing means extending through said fourth section, said support being adapted to support said under-platen in each of said four sections of said machine and to support said under-platen in its movement between each of said sections, said motion-imparting mechanism cooperating with said advancing means to advance said under-platen successively through each of said four sections.

5. A machine for applying selenium to base plates that comprises advancing means for providing advancements of uniform length and for providing rests of uniform duration, a first section that includes a loading area, a chamber and a source of heat for said chamber, said source of heat for said chamber being adapted within a period of time which is an integral multiple of said period of duration of rest to heat base plates carried by said advancing means, said advancing means extending through said first section, a second section adjacent and contiguous to said first section, said second section containing a powder-distributing trough, said trough being dimensioned to supply powder for said base plates during said advancements, said advancing means extending through said second section, a third section adjacent and contiguous to said second section, said third section containing a press that has a fixed platen and a movable platen, said press acting during a period of time which is an integral multiple of said period of duration of rests to press said base plates, said advancing means extending through said third section, a fourth section adjacent and contiguous to said third section, said fourth section including an oven chamber, a source of heat for said oven chamber, and an unloading area, said oven chamber having a length that is an integral multiple of said length of advancement, said source of heat for said oven chamber being adapted within a period of time which is an integral multiple of said period of duration of rest to heat said base plates, said advancing means extending through said fourth section, a time-controlled means to actuate said advancing means, means controlled by the time-controlled means for moving said movable platen of said press, and a mechanism that responds to the position of said advancing means to halt said advancing means.

6. A machine for applying selenium to base plates that comprises an advancing means for providing advancements of uniform length and for providing rests of uniform duration, a time-controlled means to initiate advancement of said belts, said advancing means extending through said machine, a first section that includes a loading area, a chamber and a source of heat for said chamber, said source of heat for said chamber being adapted within a period of time which is an integral multiple of said period of duration of rest to heat said base plates carried by said advancing means, said advancing means extending through said first section, a second section adjacent and contiguous to said first section, said second section containing a powder-distributing trough, and an agitator in said powder-distributing trough that regulates the discharge of selenium powder from said trough, said trough being dimensioned to supply powder for said base plates during said advancements, said advancing means extending through said second section, a third section adjacent and contiguous to said second section, said third section containing a press that has a fixed platen and a movable platen, means controlled by the time-controlled means for moving said movable platen of said press, said press having a length that is an integral multiple of said length of advancements, said advancing means extending through said third section, a fourth section adjacent and contiguous to said third section, said fourth section including an oven chamber, a source of heat for said oven chamber, and an unloading area, said source of heat for said oven chamber being adapted within a period of time which is an integral multiple of said period of duration of rest to heat said base plates, said advancing means extending through said fourth section, a means to actuate said advancing means, and a second means that halts said advancing means, said advancing means and said agitator being synchronized so selenium powder is discharged from said trough whenever said base plates pass beneath said trough.

7. A machine for applying selenium to base plates that comprises an advancing means for providing advancements of uniform length and for providing rests of uniform duration, said advancing means extending through said machine, a first section that contains a chamber and a source of heat for said chamber, said source of heat for said chamber being adapted within a period of time which is an integral multiple of said period of duration of rest to heat said base plates to be coated with selenium, said advancing means extending through said first section, a second section adjacent and contiguous to said first section, said second section including a powder-distributing trough, a second powder-distributing trough, and rotors in each of said powder-distributing troughs, each of said rotors being rotatable to cause selective distribution of powder onto said base plates carried by said advancing means, said rotors being synchronized with said advancing means whereby said rotors are motionless when said advancing means is motionless, each of said powder-distributing troughs being dimensioned to supply powder for said base plates during said advancements, said advancing means extending through said second section, a third section adjacent and contiguous to said second section, said third section including a press that has a fixed platen and a movable platen, said press acting during a period of time which is an integral multiple of said period of duration of rest to press said base plates, said advancing means extending through said third section, a fourth section adjacent and contiguous to said third section, said fourth section containing an oven chamber, a source of heat for said oven chamber, and an unloading area, said source of heat for said oven chamber being adapted within a period of time which is an integral multiple of said period of duration of rest to heat said base plates, and a time-controlled means to actuate said advancing means, means controlled by the time-controlled means for moving said movable platen by said press.

8. A machine for applying selenium to base plates that comprises an advancing means for providing advancement of uniform length and for providing rest of uniform duration, a time-controlled means to initiate advancement of said belts, said advancing means including a support extending through said machine, a first section that includes a loading area, a chamber, and a source of heat for said chamber, said source of heat for said chamber being adapted within a period of time which is an integral multiple of said period of duration of rest to heat said base plates, said support extending through said first section, a second section adjacent and contiguous to said first section, said second section containing a powder-distributor, and an agitator in said powder-distributor, said distributor being dimensioned to supply powder for said base plates during said advancements, said support of said advancing means extending through said second section, a third section adjacent and contiguous to said second section, said third section including a press that has a fixed platen and a movable platen, means controlled by the time-controlled means for moving said movable platen of said press, said press being adjacent said second section, said press acting during a period of time which is an integral multiple of said period of duration of rest to press said base plates, said support of said advancing means extending through said third section, a fourth section adjacent and contiguous to said third section, said fourth section including an oven chamber, a source of heat for said oven chamber, and an unloading area, said source of heat for said oven chamber being adapted within a period of time which is an integral multiple of said period of duration of rest to heat said base plates, said support of said advancing means extending through said fourth section, and a mechanism to actuate said advancing means, a second mechanism to halt said advancing means, the stationary pressure member of said press underlying said advancing means and the movable pressure member of said press overlying said advancing means and being movable toward and away from said advancing means, said upper pressure member of said press and said agitator being synchronized with said advancing means whereby said upper pressure member is spaced from said advancing means whenever the advancing means is moving and said agitator is motionless when said advancing means is stationary.

9. A machine for applying selenium to base plates that comprises an advancing means for providing advancements of uniform length and for providing rests of uniform duration, a time-controlled means to initiate advancement of said belts, a first section that includes a loading area, a chamber and a source of heat for said chamber, said source of heat for said chamber being adapted within a period of time which is an integral multiple of said period of duration of rest to heat said base plates, said advancing means extending through said first section, a second section adjacent and contiguous to said first section, said second section containing a powder distributor disposed above said advancing means, said distributor being dimensioned to supply powder for said base plates during said advancements, said advancing means extending through said second section, a third section adjacent and contiguous to said second section, said third section including a press that has a fixed platen and a movable platen, means controlled by the time-controlled means for moving said movable platen of said press, said press acting within a period of time which is an integral multiple of said period of duration of rest to press said base plates, said advancing means extending through said third section, a fourth section adjacent and contiguous to said third section, said fourth section containing an oven chamber and a source of heat for said oven chamber, said source of heat for said oven chamber being adapted within a period of time which is an integral multiple of said period of duration of rest to heat said base plates, a means to actuate said advancing means, and a second means to halt said advancing means, said movable pressure member of said press having a flexible pressing face thereon.

10. A machine for applying selenium to base plates that comprises an advancing means for providing advancements of uniform length and for providing rests of uniform duration, a time-controlled means to initiate advancement of said belts, said advancing means extending through said machine, a first section that includes a loading area, a chamber and a source of heat for said chamber, said source of heat for said chamber being adapted within a period of time which is an integral multiple of said period of duration of rest to heat said base plates carried by said advancing means, said advancing means extending through said first section, a second section adjacent and contiguous to said first section, said second section containing a powder distributor disposed above said advancing means, said distributor being dimensioned to supply powder for said base plates during said advancements, said advancing means extending through said second section, a third section adjacent and contiguous to said second section, said third section including a press that has a fixed platen and a movable platen, means controlled by time-controlled means for moving said movable platen of said press, said press acting during a period of time which is an integral multiple of said period of duration of rest to press said base plates, said advancing means extending through said third section, a fourth section adjacent and contiguous to said third section, said fourth section including an oven chamber, a source of heat for said oven chamber, and an unloading area, said source of heat for said oven chamber being adapted within a period of time which is an integral multiple of said period of duration of rest to heat said base plates, said advancing means extending through said fourth section, a means to actuate said advancing means, and a second means to halt said advancing means, said movable pressure member having a flexible face thereon and having a vibrator adapted to impart vibrations to said pressing face.

11. In a machine for supplying selenium to base plates that comprises an advancing mechanism for providing advancements of uniform length and for providing rests of uniform duration, a time-controlled means to initiate advancement of said belts, said advancing means extending through said machine, a first section that contains a chamber and a source of heat for said chamber, said source of heat for said chamber being adapted within a period of time which is an integral multiple of said period of duration of rest to heat said base plates carried by said advancing means, said advancing means extending through said first section, a second section adjacent and contiguous to said first section, said second section containing a powder distributor disposed above said advancing means, said distributor being dimensioned to supply powder for said base plates during said advancements, said advancing means extending through said second section, a third section adjacent and contiguous to said second section, said third section including a press that has a fixed platen and a movable platen, means controlled by the time-controlled means for moving said movable platen of said press, said press acting during a period of time which is an integral multiple of said period of duration of rest to press said base plates, said advancing means extending through said third section, a fourth section adjacent and contiguous to said third section, said fourth section containing an oven chamber, a source of heat for said oven chamber and an unloading area, said source of heat for said oven chamber being adapted within a period of time which is an integral multiple of said period of duration of rest to heat said base plates, said advancing means extending through said fourth section, a means to actuate said advancing means, and a second means to halt said advancing means, the improvement which comprises a movable pressure member for said press which has a flexible pressing face thereon, said pressing face being secured at one end of said upper pressure member and having its other end free, the free end of said pressing face being biased away from said movable pressure member but being bendable into parallelism with said upper pressure member.

12. A machine for applying selenium to base plates that comprises an advancing means for providing advancements of uniform length and for providing rests of uniform duration, said advancing means extending through said machine, a first section that includes a loading area, a chamber and a source of heat for said chamber, said source of heat for said chamber being adapted within a period of time which is an integral multiple of said period of duration of rest to heat said base plates carried by said advancing means, said advancing means extending through said first section, a second section adjacent and contiguous to said first section, said second section including a powder-distributing trough, said trough being disposed above said advancing mechanism and being dimensioned to supply powder for said base plates during said advancements, said advancing means extending through said second section, a third section adjacent and contiguous to said second section, said third section including a press that has a fixed platen and a movable platen, said press acting during a period of time which is an integral multiple of said period of duration of rest to press said base plates, said advancing means extending through said third section, a fourth section adjacent and contiguous to said third section, said fourth section including an oven chamber, a source of heat for said oven chamber, and an unloading area, said source of heat of said oven chamber being adapted within a period of time which is an integral multiple of said period of duration of rest to heat said base plates, said advancing means extending through said fourth section, a time controlled means to actuate said advancing means, means controlled by the time-controlled means for moving said movable platen of said press, other means to halt said advancing means, movable doors on said chamber and movable doors on said oven, said doors being movable to open position when said advancing means moves and being movable to closed position when said advancing means is at rest.

13. A machine for applying selenium to base plates that comprises an advancing means for providing advancements of uniform length and for providing rests of uniform duration, said advancing means extending through said machine, a first section that includes a loading area, a chamber and a source of heat for said chamber, said source of heat for said chamber being adapted within a period of time which is an integral multiple of said period of duration of rest to heat said base plates carried by said advancing means, said advancing means extending through said first section, a second section adjacent and contiguous to said first section, said second section containing a powder distributor disposed above said advancing means, said distributor being dimensioned to supply powder for said base plates during said advancements, said advancing means extending through said second section, a third section adjacent and contiguous to said second section, said third section including a press that has a fixed platen and a movable platen, said press acting during a period of time which is an integral multiple of said period of duration of rest to press said base plates, said advancing means extending through said third section, a fourth section adjacent and contiguous to said third section, said fourth section including an oven chamber, a source of heat for said oven chamber, and an unloading area, said source of heat for said oven chamber being adapted within a period of time which is an integral multiple of said period of duration of rest to heat said base plates, said advancing means extending through said fourth section, a time-controlled means to actuate said advancing means, means controlled by the time-controlled means for moving said movable platen of said press, and a second means that responds to the position of said advancing means to halt said advancing means, said advancing means and said press being synchronized whereby said press is opened whenever said advancing means moves and is closed whenever said advancing means is at a rest.

CARL E. PETERS.
DAVID W. RAU.
AUGUST H. BRUEMMER.

REFERENCES CITED

The following references are of record in the file of this patent:

UNITED STATES PATENTS

| Number | Name | Date |
|---|---|---|
| 2,276,647 | Conrad et al. | Mar. 17, 1942 |
| 2,364,642 | Miller et al. | Dec. 12, 1944 |
| 2,378,438 | Saslaw et al. | June 19, 1945 |
| 2,380,026 | Clarke | July 10, 1945 |
| 2,393,938 | Skinker | Jan. 29, 1946 |
| 2,413,013 | Von Hippel | Dec. 24, 1946 |
| 2,423,051 | Smith et al. | June 24, 1947 |